Oct. 1, 1935.  C. CHRISTOFFERSON  2,016,033
AIR FILTER
Filed Oct. 17, 1932   2 Sheets-Sheet 1
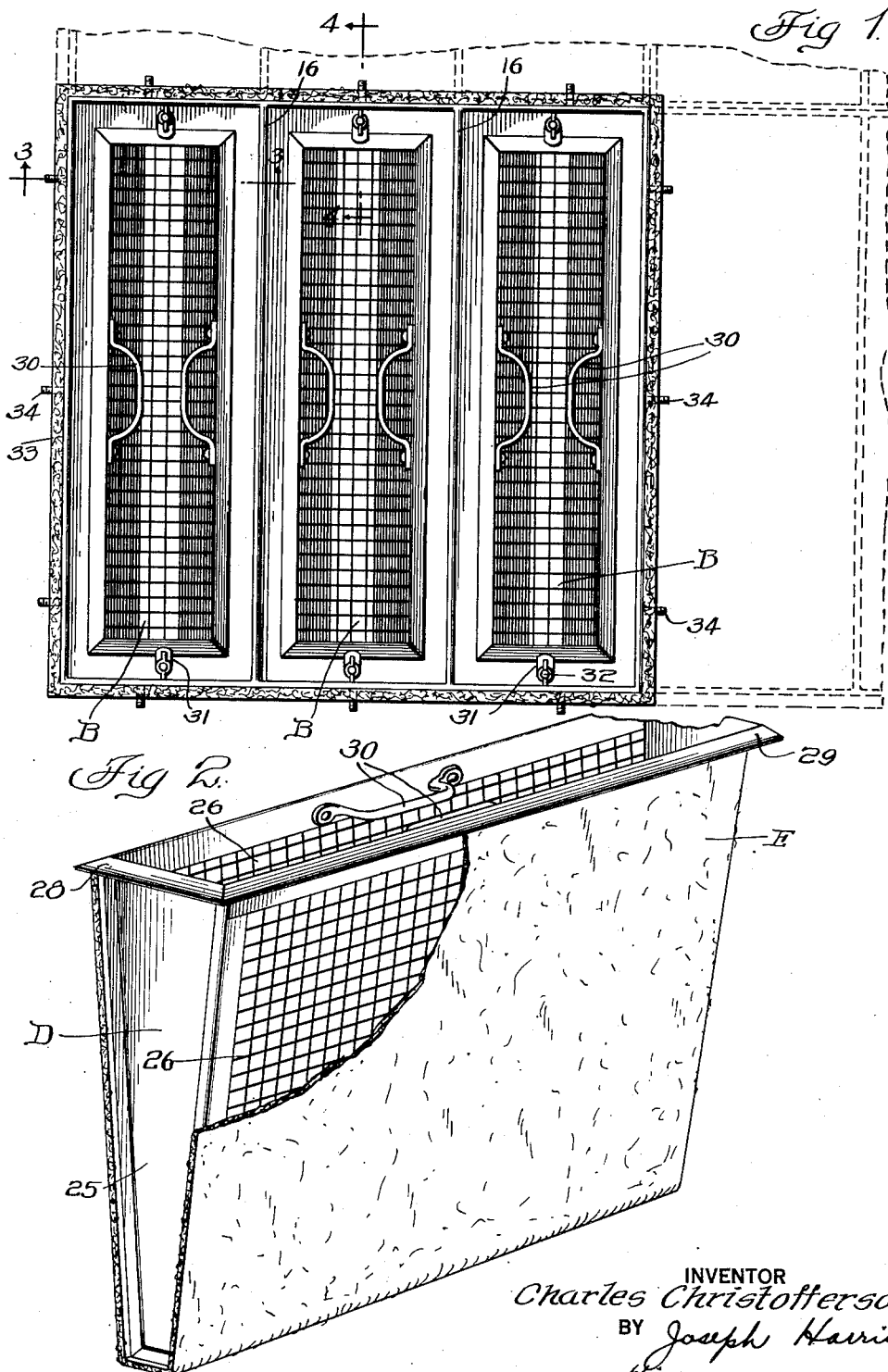

Oct. 1, 1935.　　　　C. CHRISTOFFERSON　　　　2,016,033
AIR FILTER
Filed Oct. 17, 1932　　　2 Sheets-Sheet 2
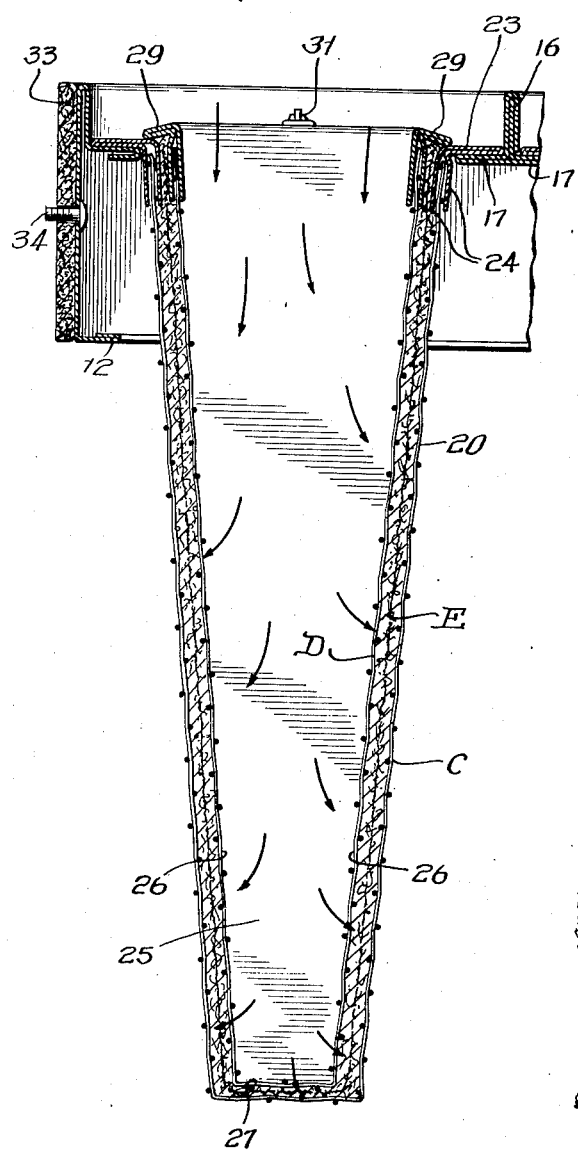
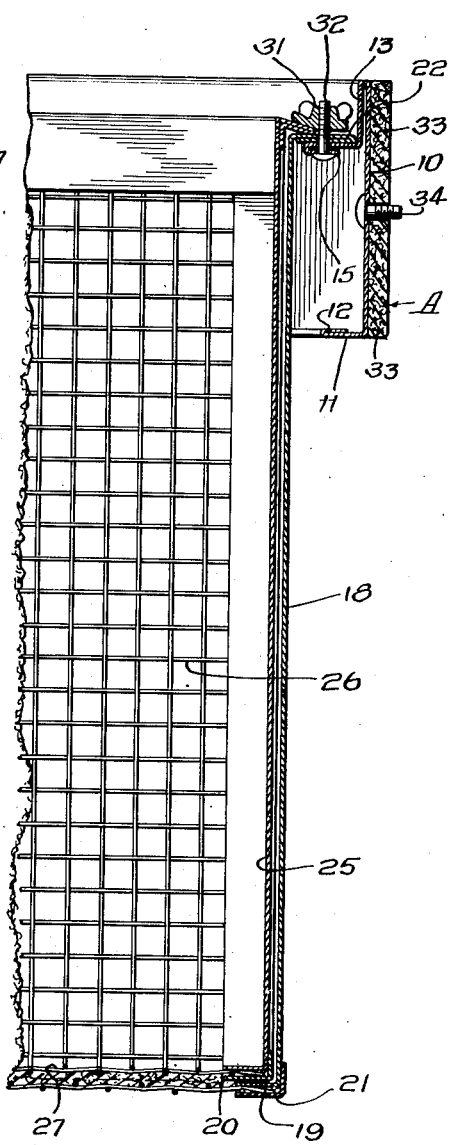
INVENTOR
Charles Christofferson
BY Joseph Harris
His ATTORNEY Patented Oct. 1, 1935

2,016,033

UNITED STATES PATENT OFFICE 2,016,033

AIR FILTER

Charles Christofferson, Duluth, Minn., assignor to Universal Air Filter Corporation, Duluth, Minn., a corporation of Minnesota Application October 17, 1932, Serial No. 638,046

2 Claims. (Cl. 183—50)

This invention relates to improvements in air filters, and more particularly air filters for ventilating systems.

In the art of filtering large volumes of air for ventilating systems, such as used in homes, schools, theaters and other buildings, much difficulty has always heretofore been encountered in providing a satisfactory filter medium that would not quickly clog and which when it eventually did become clogged could be quickly and easily renewed at small expense. Especially have these difficulties been experienced in ventilating systems operated on the gravity principle where relatively large areas of filter surface per cubic foot of air treated and with relatively slight resistances to the flow of air, are required.

One object of this invention is to provide an air filter which will be compact yet provides an exceptionally relatively large area of effective filtering surface and at the same time offering relatively low resistance to the passage of air therethrough.

Another object of the invention is to provide an air filter so arranged that an inexpensive type of filter medium may be employed, such as cotton batting obtainable in rolls or sheets in the open market, and so utilized that the used filter medium may be replaced with a minimum of time and labor required to effect the replacement.

Still another object of the invention is to provide an air filter unit of the character specified in the preceding objects of the invention, which may be readily assembled with any number of additional like units to provide the necessary capacity for any given installation.

Other objects of the invention will more clearly appear from the description and claims hereinafter following.

In the drawings forming a part of this specification, Figure 1 is an elevational view of a unit embodying the invention, portions of additional units showing the manner of assembling therewith being indicated in dotted lines. Figure 2 is a perspective view of one of the baskets or retainers employed for inserting and retaining the filter medium, parts being broken away to more clearly disclose certain features of the construction. And Figures 3 and 4 are sectional views upon somewhat enlarged scales, corresponding to the section lines 3—3 and 4—4 respectively of Figure 1.

In said drawings, the improved unit comprises a main frame A and three like filtering chambers or compartments B—B.

The frame A, preferably made of sheet metal, is of rectangular outline with vertical side and end walls 10—10, the metal thereof being bent inwardly along the bottom, as indicated at 11—11 and then doubled over upon itself, as indicated at 12, to provide the necessary strength and rigidity. At the top, the sheet metal is folded back upon itself, as indicated at 13, is then extended inwardly at right angles, and doubled upon itself as indicated at 15, to further increase the strength and rigidity of the frame and also to provide a supporting and attaching shelf for the three sets of filtering devices proper. At uniformly spaced intervals, two transverse partitions are incorporated in the frame, as indicated at 16—16, the same being preferably composed of sheet metal suitably folded upon itself, as best shown in Figure 3, to provide a bar of generally T cross section with oppositely extending supporting ledges 17—17. As will be understood, the cross bars 16 are soldered or welded to the main portions of the frame A so as to provide a unitary frame structure.

Each of the three filtering sub-units proper, comprises two main members C and D with the filter medium E interposed therebetween. The member C, which may be termed the holder, is comprised of sheet metal and a relatively coarse mesh screen and is made relatively long, relatively narrow, and relatively deep and tapered in transverse section from its mouth end to its inner end, all sides, end and bottom being flat. The two end walls of said holder or member C are of sheet metal and parallel, as best indicated at 18 in Figure 4, the sheets being bent inwardly at right angles at the bottom, as indicated at 19, to give strength and rigidity thereto and also to permit of the clamping of the bottom section of wire screening 20 between it and an angular binding strip 21 soldered or spot welded to the side wall 18. At its upper end, each end wall 18 is bent outwardly at right angles, as indicated at 22, and doubled upon itself so as to provide a laterally outstanding shoulder to be seated on the corresponding supporting shelf 15 of the wall 10. On the two elongated sides, the holder C is provided at the top thereof with a supporting shelf 23 preferably comprised of sheet metal doubled over upon itself and bent at right angles, as indicated in Figure 3, the two depending sections 24—24 embracing and securing the upper edges of the wire screen 20. It will also be understood that the vertical edges of the end walls 18 will be formed similar to the bottom edge 19—21 to secure the vertical edges of the wire screen 20, thus providing a basket-like holder with closed end walls 18 and open mesh flat side and bottom walls of uniform extent or width considered lengthwise of the holder. Each of said holders C is inserted within the frame A and supported on the shelves 14—17 thereof and preferably soldered or welded in place so as to afford permanent connection with the frame A.

Each of the removable members or retainers D is of the same form as its corresponding holder C but of slightly lesser dimensions so as to be readily insertible and removable therefrom. As best shown in Figures 2 and 3, each of said members D is formed with flat or plain, parallelly disposed sheet metal end walls 25, relatively coarse mesh screen, flat side walls 26—26 and similar narrow flat bottom wall 27 with a rigid sheet metal rectangular frame 28 at the top thereof, it being understood that the screening is secured to the metal parts in the same manner as hereinbefore described for the corresponding holders C. As will be apparent, the reticulated or mesh screened side walls 26—26 and bottom wall 27 are also of uniform extent or width, considered lengthwise of the retainer as in the case of the holders. At the top, the frame 28 is so formed that the outstanding doubled over flanges 29—29 will rest upon the corresponding flanges of the holder C when the parts are assembled, as best shown in Figure 3. To facilitate handling of the retainers D, the latter are preferably provided with hand holds 30—30 secured to the frame 28 on the interior thereof, as shown in Figures 1 and 2. Each retainer D is adapted to be held in assembled position with the other parts by means of a pair of wing nuts 31—31 at opposite ends thereof, said wing nuts being threaded on stove bolts 32, permanently secured to, as by welding or soldering, the supporting flanges 15 of the frame A and extended upwardly therethrough and also through the overlying flanges 22 of the holders C.

As best indicated in Figure 3, a substantially uniform spacing will be left between all opposed sections of the wire screen flat walls of the nested holder and retainer and this spacing is utilized for the filter medium. A most satisfactory filter medium has been found to be two or more plies or sheets of cotton batting, such as is readily obtainable commercially in rolls or sheets. Such filter medium, two layers or plies of which are indicated at E, is applied as follows. The inner member or retainer D of basket-like form is withdrawn and two or more sheets or layers of the cotton batting, cut to the proper length, are then wrapped or folded around the two wire screen flat sides and bottom of the member D as shown in Figure 2, it being understood that the cotton batting will be of proper width to extend fully to the ends of the member D, as shown. The filter medium can be readily smoothed out and drawn more or less taut over the flat surfaces on which it lies so as to prevent bunching or displacement, the loose cotton fibers more or less clinging to the wires, as will be understood. The retainer D with the filter medium smoothly applied thereto, is then inserted or nested carefully within its corresponding holder C until the parts are assembled as shown in Figures 3 and 4, whereupon the retainer D is locked in position by the wing nuts 31. The filter medium will then be held in slightly compressed condition between the two opposed sets of flat screen surfaces, providing a filtering area of uniform or substantially uniform resistance to the passage of air therethrough. After the filter medium has been used and become impregnated with dirt, dust and other foreign matter, it is renewed or replaced by withdrawing the retainer D, tearing off the used filter medium and applying new thereto, as will be understood. The filter medium, if cotton batting is employed, may have its filtering qualities increased by spraying or impregnating the cotton batting with a light oil.

With the arrangement so far described, it will be observed that the air enters the mouth of each filtering chamber and, on account of the tapering or converging filter walls, the outer strata of the incoming current of air, as indicated by the arrows, will first strike the filtering surfaces near the mouth of the chamber and progressively the inner strata of the current of air will strike other portions of the filtering surface further down and so on until the central strata of the current of air will pass through the bottom portions of the filtering area. In this manner, in a very compact arrangement, a large area of filtering surface is provided, the resistance to the passage of air through the filter medium may be kept relatively low and thus adapt the filter particularly to the gravity type system. Obviously, renewal of the filter medium may be made at minimum expense and without the necessity of employing specially skilled labor in connection therewith and no special pre-shaping or pre-forming of the filter medium is required.

Around all sides of the frame A is preferably applied a layer of felt 33, which may be attached by glue or other suitable means, the felt serving the double function of minimizing noise when the unit is attached to any other part and also to provide a tight joint with either the air duct or with adjacent units, as indicated in Figure 1. To facilitate attachment of each unit either to the walls of the air duct or to adjacent units, each frame A is provided in each wall thereof with a plurality of bolts 34 extended outwardly therethrough beyond the felt, as best indicated in Figures 3 and 4, it being understood that said bolts will be passed through correspondingly alined openings in either the frames of adjacent units or in the walls of the air duct, and nuts applied thereon to fasten the parts together. As indicated by the dotted lines in Figure 1, each unit may be assembled with any desired number of other like units so as to build up a filter of the desired capacity for any given installation.

The invention has been shown and described in what is now considered the preferred manner of carrying out the same, but as will be understood, various changes and modifications may be made without departing from the spirit of the invention and all such changes and modifications are contemplated as come within the scope of the claims appended hereto.

What is claimed is:

1. A filter of the character described including: a supporting framework having a plurality of cross bars defining a plurality of similar openings in the framework; a holder in each of said openings and secured to the framework and cross bars, each said holder having a rectangular mouth frame, sheet metal end walls rigid with the mouth frame and screening constituting the sides of the holder and secured to the mouth frame and end walls; a retainer for each of said holders, each retainer comprising a metal mouth frame, sheet metal end walls secured to the mouth frame, and screening constituting the sides of the retainer and secured to the end walls and mouth frame, each retainer being of slightly less dimensions than the corresponding dimensions of the holder and of the same general shape whereby the screen sides of each holder and corresponding retainer are slightly spaced from each other when the holder and retainer are in operative position; a section of previously unshaped filter medium of the character of cotton batting applied over and covering the screening of each retainer, each retainer with its said filter medium thereon being insertible as a unit within and removable from a holder while the latter is retained in position on the supporting frame and, when in place, the filter medium is retained and supported by and against the opposed screening side walls; and means for detachably securing each retainer in place on the framework.

2. A filter of the character described including: a supporting framework; a holder secured to the framework, said holder having a rectangular mouth frame, sheet metal end walls rigid with the mouth frame and screening constituting the sides of the holder and secured to the mouth frame and end walls; a retainer cooperable with said holder, said retainer comprising a metal mouth frame, sheet metal end walls secured to the mouth frame, and screening constituting the sides of the retainer and secured to the end walls and mouth frame, said retainer being of slightly less dimensions than the corresponding dimensions of the holder and of the same general shape whereby the screen sides of the holder and retainer are slightly spaced from each other when the holder and retainer are in assembled operative position; a section of previously unshaped filter medium of the character of cotton batting applied over and covering the screening of said retainer, said retainer with its said filter medium thereon being insertible as a unit within and removable from the holder while the latter is retained in position on the supporting frame and, when in place, the filter medium is retained and supported by and against the opposed screening side walls; and means for detachably securing the retainer in place on the framework.

CHARLES CHRISTOFFERSON.